US008059185B2

(12) United States Patent
Nose

(10) Patent No.: US 8,059,185 B2
(45) Date of Patent: Nov. 15, 2011

(54) PHOTOGRAPHING APPARATUS, IMAGE DISPLAY METHOD, COMPUTER PROGRAM AND STORAGE MEDIUM FOR ACQUIRING A PHOTOGRAPHED IMAGE IN A WIDE RANGE

(75) Inventor: Hiroyasu Nose, Shinjuku-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 11/321,004

(22) Filed: Dec. 28, 2005

(65) Prior Publication Data
US 2007/0146530 A1    Jun. 28, 2007

(51) Int. Cl.
G02B 13/16       (2006.01)
H04N 7/14        (2006.01)
H04N 7/00        (2011.01)
G06K 9/36        (2006.01)

(52) U.S. Cl. ........ 348/335; 348/14.16; 348/36; 348/284
(58) Field of Classification Search ............... 348/335, 348/14.07, 14.16, 36; 382/284
See application file for complete search history.

(56) References Cited

U.S. PATENT DOCUMENTS

| 2,828,664 | A | * | 4/1958 | Hoch ......................... 396/386 |
| 5,937,212 | A | * | 8/1999 | Kurahashi et al. ............. 396/20 |
| 6,392,658 | B1 | * | 5/2002 | Oura ........................... 345/629 |
| 2003/0210329 | A1 | * | 11/2003 | Aagaard et al. ............. 348/159 |
| 2004/0061774 | A1 | * | 4/2004 | Wachtel et al. ................ 348/36 |
| 2006/0119728 | A1 | * | 6/2006 | Shirakura .................... 348/335 |

FOREIGN PATENT DOCUMENTS

| JP | 6-295333 | 10/1994 |
| JP | 7-67020 | 3/1995 |
| JP | 9-93471 | 4/1997 |
| JP | 9-505447 | 5/1997 |
| JP | 2001-204015 | 7/2001 |

* cited by examiner

Primary Examiner — Jason Chan
Assistant Examiner — Joel Fosselman
(74) Attorney, Agent, or Firm — Cowan, Liebowitz & Latman, P.C.

(57) ABSTRACT

A photographing apparatus comprises a plurality of optical image pickup units which converges object light and forming an optical image on a focus plane of an image pickup device and an image forming unit which forms a plurality of photographed images from optical images formed by the optical image pickup units. The optical axes of the optical image pickup units cross at one point near lenses, the optical image pickup units are disposed at an equal distance from the cross point, and the optical axes are set at a predetermined angle in such a manner that photographing fields of adjacent optical image pickup units are made contiguous with each other.

10 Claims, 9 Drawing Sheets

PRIOR ART  FIG. 15
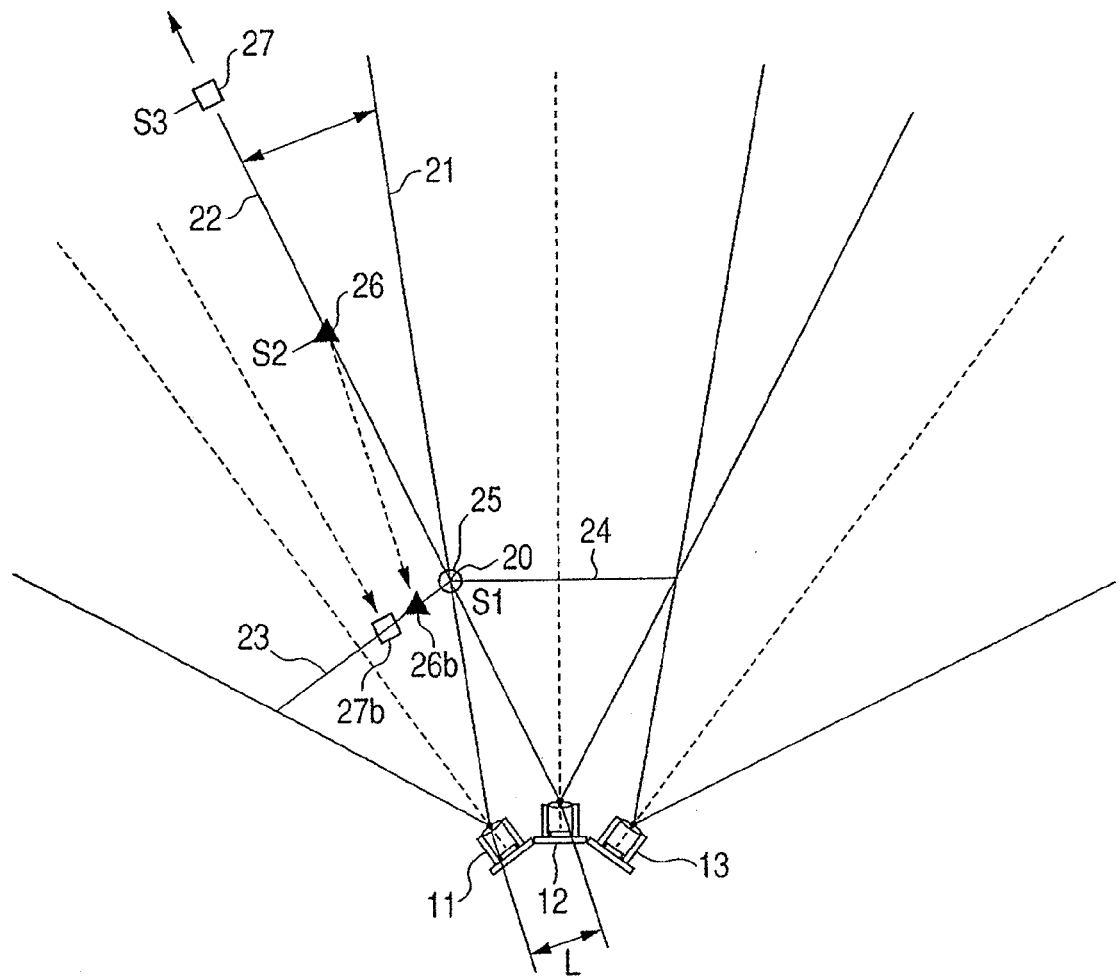
PRIOR ART  FIG. 16
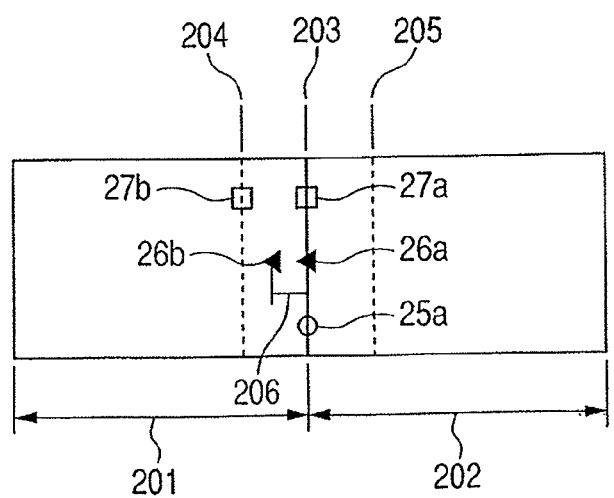

PHOTOGRAPHING APPARATUS, IMAGE DISPLAY METHOD, COMPUTER PROGRAM AND STORAGE MEDIUM FOR ACQUIRING A PHOTOGRAPHED IMAGE IN A WIDE RANGE

BACKGROUND OF THE INVENTION

1. Field of the Invention

The present invention relates to technologies for acquiring a photographed image in a wide range by using a photographing apparatus.

2. Related Background Art

A wide-angle photographing apparatus is known which can acquire a photographed image in a wide range by combining photographed images taken with a plurality of optical photographic systems. For example, this wide-angle photographing apparatus is applied to a monitor camera, a television conference camera and the like.

For a wide range photographing system, a method has been proposed by which a plurality of cameras are disposed radially as shown in FIG. 10 and photographed images taken with the cameras are joined together to realize paronama photographing. A camera 1 is disposed on each side of a polygonal housing 101 to photograph each divided area of a photographing range of 360°. The system of this kind is disclosed, for example, in Japanese Patent Application Laid-open Nos. H07-067020, H09-093471, No. 2001-204015 and the like.

Another system has also been proposed in which a hyperbolic mirror is used to photograph a whole peripheral area as shown in FIG. 11. One camera is disposed under a hyperbolic mirror 102 and a whole peripheral image is focussed on an image pickup device of the camera 1. An image focussed on the image pickup device will be described with reference to FIG. 12. In FIG. 12, an image in a whole peripheral area is focussed on a ring area 104 of an image pickup device 103. When the image is displayed on a monitor or the like, image processing is performed by an unrepresented processor circuit to convert the image in a laterally elongated panorama image. The system of this type is disclosed, for example, in Japanese Patent Application Laid-open No. H06-295333 and Japanese Patent Publication No. H09-505447 and the like.

A conventional system in which a plurality of cameras are disposed radially will be described with reference to FIG. 13.

In FIG. 13, three cameras 11, 12 and 13 are disposed radially to realize wide-angle photographing. The camera 11 is constituted of a photographing lens 2, an image pickup device 4 such as CCD and CMOS and a substrate 6, and a sector photographing field angle having a center at the principal point of the lens 2 on the object side is focussed on the image pickup device 4. The structure of the cameras 12 and 13 is similar to that of the camera 11, and the cameras are disposed so that the photograph field angles are overlapped. With the photographic field angles of the cameras 11 and 12, an object in the oblique line area surrounded by field angle boundaries 21 and 22 and their cross point 20 is taken into both the photographed images of the cameras 11 and 12.

Ideally, as shown in FIG. 14, if the principal point 3 of each camera on the object side is made coincident, an image taken with each camera has no parallax so that the images are contiguous with each other at each joining point and it is easy to join the images smoothly. However, in practice, each camera has a physical size and is interfered with each other. It is therefore difficult to dispose the cameras in such a manner that the principal points on the object side become coincident. From this reason, the radial layout such as shown in FIG. 13 has been used conventionally. Therefore, the principal points of adjacent cameras on the object side are spaced apart by a distance L shown in FIG. 13 (hereinafter this distance L is called a base line length).

With this layout, photographed images taken with adjacent cameras have a larger parallax difference as the base line length L becomes longer. Therefore, in an area where the joining portions are overlapped, the positions of an object in the adjacent photographed images differ considerably and the images in the joining portions are not coincident. It is therefore difficult to join the two images smoothly.

With reference to FIG. 15, description will be made on how an object is photographed in an area where the photographing field angles of adjacent cameras are overlapped. A nearest distance between the photographing ranges of cameras 11 and 12 is represented by S1. It is assumed that the cameras are disposed in such a manner that the boundary 21 of the photographing field angle of the camera 11 crosses the boundary 22 of the photographing field angle of the camera 12, at a cross point 20 at the nearest distance S1.

The photographed images to be taken with the cameras 11 and 12 are focused via lenses on the image pickup devices. The photographed images do not change even if it is virtually assumed that the image pickup plane exists on the object side with respect to the lens. Description will be made therefore assuming that the image pickup planes are at 23 and 24. An object 25 (white circle symbol) at the cross point 20 of the nearest distance S1 is photographed on the boundary between the image pickup planes 23 and 24 of the cameras 11 and 12. FIG. 16 shows that the photographed images 201 and 202 taken with the cameras 11 and 12 are juxtaposed in contact with each other. As shown in FIG. 16, an image 25a of the object 25 (white circle symbol) is photographed generally in unison on the boundary between the photographed images 201 and 202.

In FIG. 15, an object 26 (black triangle symbol) at a photographing distance S2 on the boundary 22 of the camera 12 is projected on the image pickup plane 23 of the camera 11 as indicated by an arrow in FIG. 15. Although not shown on the image pickup plane 24 of the camera 12, an object is projected on the boundary similar to the object 25. Therefore, in the photographed images shown in FIG. 16, although the photographed image 202 of the object 26 (black triangle symbol) is projected on the boundary as an image 26a, the photographed image 201 is projected as an image 26b shifted from the boundary. A shift amount 206 of the images taken with the cameras 11 and 12 is called a parallax amount.

An object 27 (white square symbol) at a infinite distance S3 on the boundary 22 of the camera 12 is projected on the image pickup plane 23 of the camera 11 at a position on a line parallel to the boundary 22 corresponding to the base line length L, as shown in FIG. 15. The object 27 is projected on the image pickup plane 24 of the camera 12 at the boundary similar to the objects 25 and 26. Therefore, in the photographed images shown in FIG. 16, the object 27 (white square symbol) at the infinite distance is photographed on the boundary as an image 27a in the photographed image 202, whereas it is photographed as an image 27b on a dotted line 204 in the photographed image 201. As the distance of an object becomes longer, a parallax amount 206 increases. The object at an infinite distance has a constant converged parallax amount represented by a distance between the dotted line 204 and the boundary 203 between the photographed images 201 and 201.

The foregoing description concerns about the object on the boundary 22 of the photographing field angle of the camera 12. Similar description can be made also for an object on the boundary 21 of the photographing field angle of the camera 11. Namely, as the parallax amount increases as the object distance becomes long, an object at an infinite distance is projected as an image on a dotted line 205 in the photographed image 202. An object in an area where the photographing field angles of the cameras 11 and 12 are overlapped, is duplicately photographed depending upon an object distance in the area sandwiched between the dotted lines 204 and 205, resulting in a parallax.

A parallax amount of an object at an infinite distance becomes large in proportion to the base line length L of the cameras 11 and 12. Therefore, if the base line length L is long, although the photographed images taken with the cameras 11 and 12 are coincident for an object at the nearest distance on the boundary, a parallax amount of an object at the infinite distance becomes large so that the photographed images are not coincident and smooth joining cannot be realized.

With such a radial layout, even if the cameras are disposed so as to shorten the base line length, the image pickup device substrates 6 of the cameras interfere with each other so that the lens front ends are made open. Therefore, the base line length L becomes long, a parallax difference between images taken with adjacent cameras becomes large, and it is difficult to connect the images at the joining portion without suppressing contradiction. Since the front ends of the cameras are made radially open, the camera lens layout becomes conspicuous and it is difficult to make compact the whole housing of a camera.

In a system using a hyperbolic mirror, an object image is focussed as a distorted image on the image pickup device, and converted into a normal image by image processing. Therefore, the pixel density of an image after conversion is not uniform over the whole area so that a portion greatly enlarged has coarse pixels and its image quality is degraded. There are less cases in which an image in a whole circumferential area becomes necessary for an application to a monitor camera and the like. If the monitor camera is mounted on a wall or the like, it is sufficient if the photographing field angle is about 120° to 180° in the horizontal direction. A monitor camera providing an image having a high resolution in this field angle range is desired. Such needs cannot be satisfied by a hyperbolic mirror system.

In a modeling system for generating a shape model of an existing substance described in Japanese Patent Application Laid-open No. H11-328444, a main camera and subsidiary cameras are disposed radially about a Z-axis, and their viewpoints (light reception axes) are set so that the viewpoints cross at one point (e.g., coordinate origin) on the Z-axis.

In a synchronous photographing method and system described in Japanese Patent Application Laid-open No. 2002-344800, three digital two-lens cameras each having two pairs of photographing units are used, and one camera is disposed just in front of the face of an object person, and the other two cameras are disposed at right and left positions slightly lower than the face.

SUMMARY OF THE INVENTION

The present invention solves the above-described problems and aims to provide a photographing apparatus capable of making compact a photographing unit and reducing a parallax of a plurality of photographed images, an image display method, a computer program and a storage medium.

As a means for achieving the object, the present invention provides a photographing apparatus which comprises: a plurality of optical image pickup units for converging object light and forming an optical image on a focus plane of an image pickup device; and an image forming unit for forming a plurality of photographed images from optical images formed by the optical image pickup units, wherein optical axes of the optical image pickup units cross at one point near lenses, the optical image pickup units are disposed at an equal distance from the cross point, and the optical axes are set at a predetermined angle in such a manner that photographing fields of adjacent optical image pickup units are made contiguous with each other.

BRIEF DESCRIPTION OF THE DRAWINGS

The above-described object of the present invention becomes apparent from the following drawings and the detailed description when read in conjunction with the drawings.

FIG. 15 is a diagram showing photographed images taken with a conventional wide-angle photographing apparatus having cameras disposed radially.

FIG. 16 is a diagram illustrating the state of a joining portion of photographed images taken with a conventional wide-angle photographing apparatus having cameras disposed radially.

DESCRIPTION OF THE PREFERRED EMBODIMENTS

Embodiments of the present invention will be described with reference to the accompanying drawings.

First Embodiment

Figure 1:
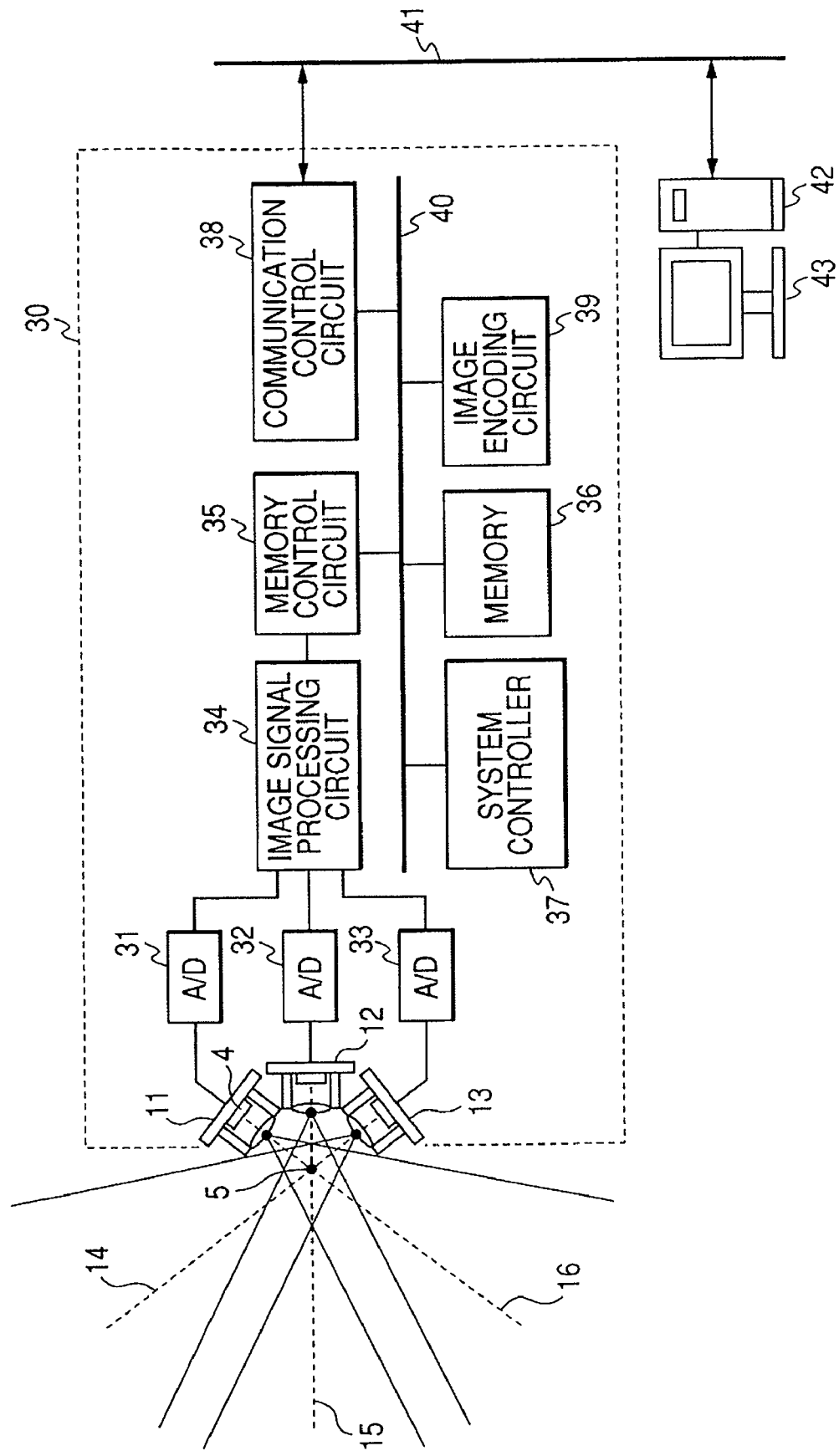
FIG. 1 is a diagram showing the outline structure of a wide-angle photographing apparatus according to a first embodiment of the present invention.

FIG. 1 is a block diagram showing the outline structure of a wide-angle photographing apparatus according to an embodiment of the present invention. In FIG. 1, a housing 30 of the wide-angle photographing apparatus accommodates cameras 11, 12 and 13 each constituted of a lens and an image pickup device, and a camera drive control circuit. Each of the cameras 11, 12 and 13 uses a single focus lens, and optical axes 14, 15 and 16 of the cameras are disposed in such a manner that the optical axes cross at a cross point of each lens on an object side.

A lens capable of being in-focus from a near field to a far field through pan focussing may be used for the camera. Alternatively a lens capable of being automatically set in-focus through auto focussing may be used. In this case, if focuses of three cameras are different, focus points of images of a panorama display are different and the images are difficult to be clearly observed. Therefore, one camera which mainly photographs an object is designated, and the focuses of the other two cameras are controlled to follow the focus of the designated camera.

If automatic exposure adjustments of the three cameras are different, brightness of each image in a panorama display becomes different and the images cannot be viewed contiguous with each other. Therefore, one camera which mainly photographs an object is designated, and the exposure adjustment values of the other two cameras are controlled to follow the exposure adjustment value of the designated camera.

Figure 2:
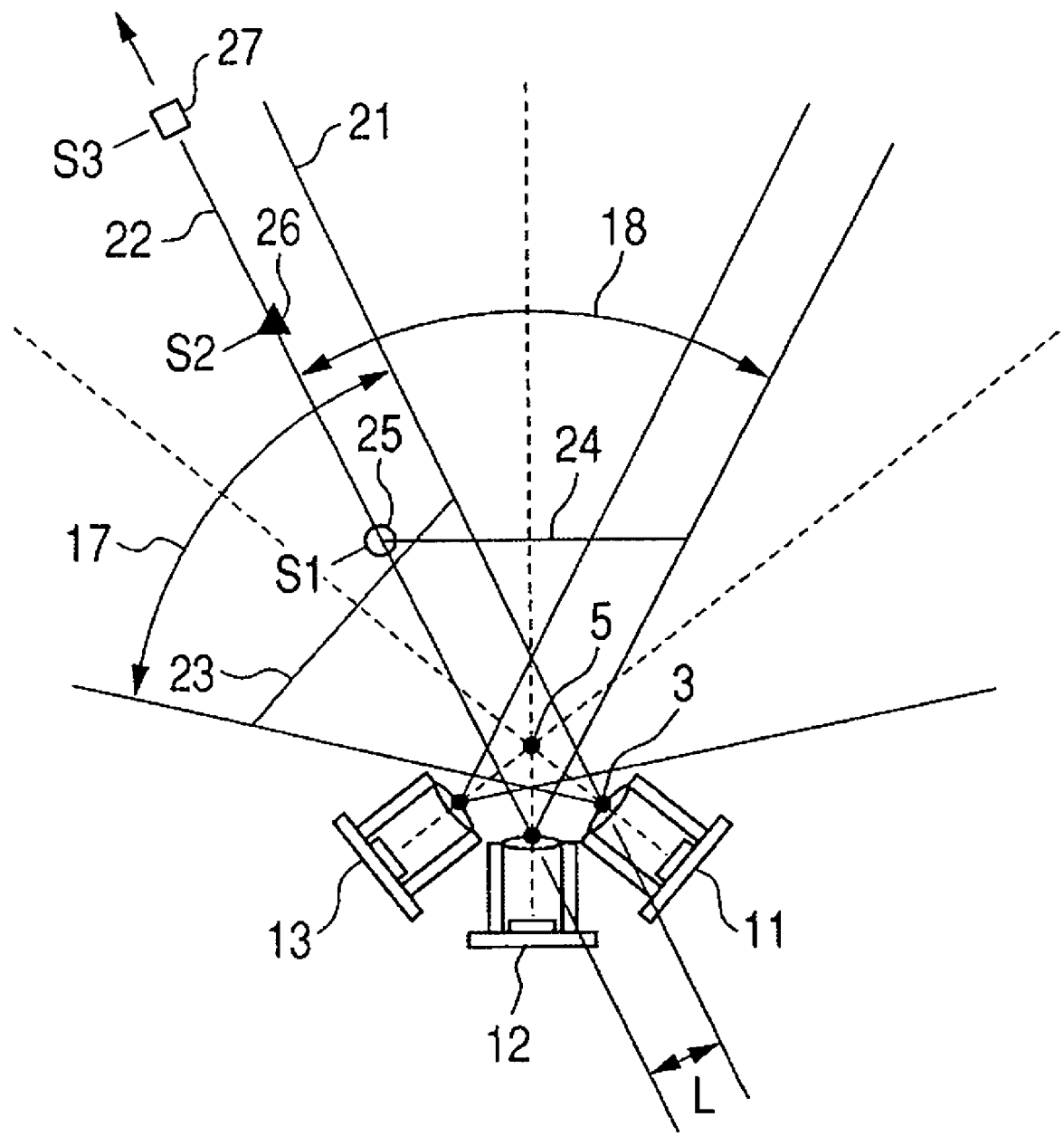
FIG. 2 is a diagram showing an example of a camera layout of the wide-angle photographing apparatus according to the first embodiment of the present invention.

Next, with reference to FIG. 2, detailed description will be made on the layout of the cameras according to the present invention. The cameras 11, 12 and 13 are disposed in such a manner that the optical axes of the cameras 11, 12 and 13 cross at a cross point 5 of the lenses on the object side, and that the photographic field angle of each camera crosses at the cross point 5 to allow each camera to photograph an image in each divided wide-angle photographing area. Adjacent cameras are disposed by making the lens front ends become near to each other as much as possible and minimizing the distance (base line length) L between principal points 3 on the object side. The adjacent cameras 11 and 12 are disposed in such a manner that a boundary 21 of a photographing field angle 17 of the camera 11 and a boundary 22 of a photographing field angle 18 of the camera 12 overlap each other by the same width equal to the base line length L, as shown in FIG. 2. The boundaries of the cameras 12 and 13 are disposed overlapping in a similar manner.

Figure 3A:
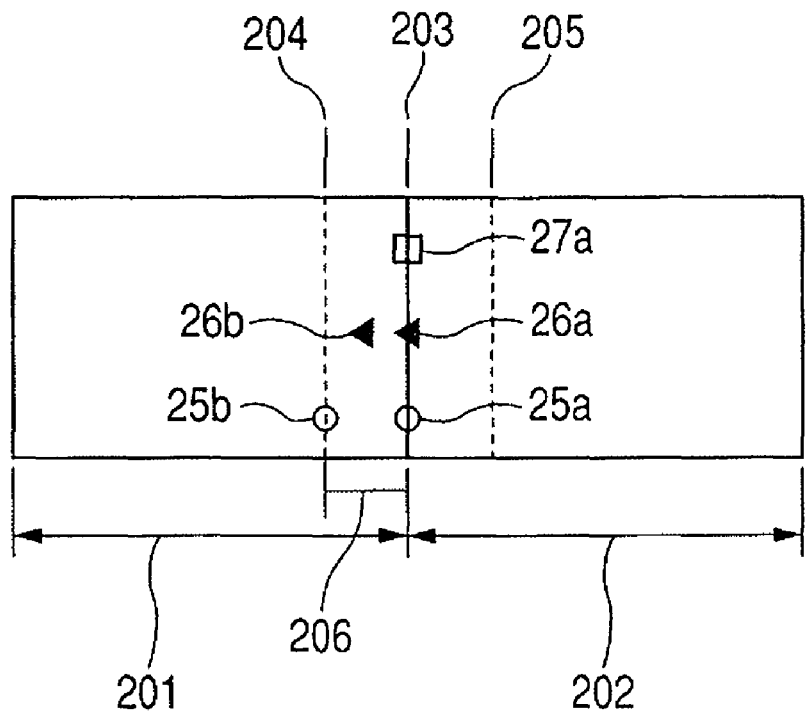
FIGS. 3A and 3B are diagrams showing photographed images taken with cameras.

FIG. 3A shows photographed images 201 and 202 on the image pickup planes of the cameras 11 and 12, the images being juxtaposed in contact with each other. In the photographed image 202 of the camera 12, the object 25 (circle symbol) at the nearest distance S is projected as an image 25a on the boundary, whereas in the photographed image 201 of the camera 11, it is projected as an image 25b. A parallax 206 appears therefore and the object is duplicately photographed.

Similarly, in the photographed image 202 of the camera 12, the object 26 (solid black triangle symbol) at the photographing distance S2 is projected as an image 26a on the boundary, whereas in the photographed image 201 of the camera 11, it is projected as an image 26b. A parallax amount is smaller than that of the object (circle symbol).

Figure 3B:
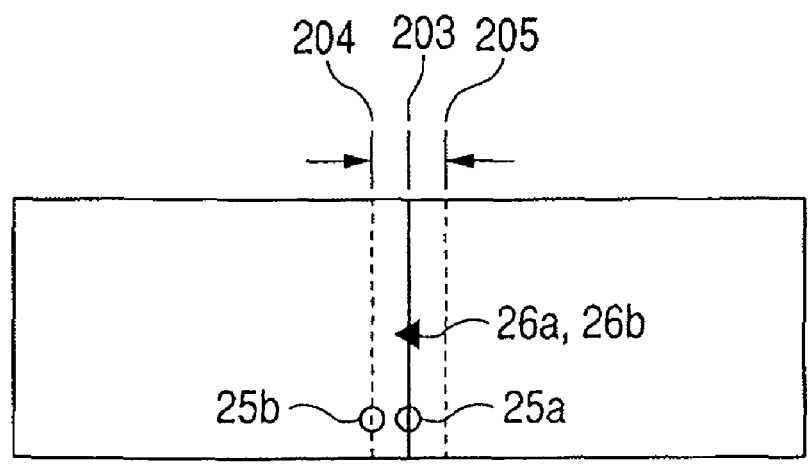

With reference to FIG. 2 and FIGS. 3A and 3B, description will be made on how objects in an overlapped area of the photographic field angles of the cameras 11 and 12 are photographed by each camera. In FIG. 2, assuming that the image pickup planes are on an object side, even if the photographed images of the cameras 11 and 12 are projected, the photographing relation will not change. Therefore, in the following description, it is assumed that the image pickup planes are at positions 23 and 24. Description will be made on how an object 26 (solid black triangle symbol) and an object 27 (square symbol) are photographed, the object 26 being on the boundary 22 at a photographing distance S2 and the object 27 being on the boundary 22 at an infinite distance S3, as referenced to an object 25 (circle symbol) on the boundary 22 at the nearest distance S1.

As above, the object in the overlapped area of the photographic field angles of the cameras 11 and 12 at the nearest distance S1 is duplicately photographed in an area sandwiched between a dotted line 204 of the photographed image 201 and a dotted line 205 of the photographed image 202, with the parallax 206. As the positions of the object become farther from the nearest distance S1, the parallax 206 becomes smaller, and the object at the infinite distance is photographed as the same image on the boundary 203 of the photographed images 201 and 202.

The area sandwiched between the dotted line 204 of the photographed image 201 and the dotted line 205 of the photographed image 202 becomes broader in proportion to the base line length L of the cameras 11 and 12. Therefore, as in the embodiment, if the cameras 11 and 12 can be disposed at a shorter base line length L, the area where an image near the boundary between the photographed images is photographed duplicately can be narrowed and a parallax amount of images can be made small. Therefore, even if the photographed images are joined at the boundary, contradiction in the joining portion can be made not conspicuous.

Referring back to FIG. 1, the overall structure of the wide-angle photographing apparatus will be described. In FIG. 1, A/D convertor circuits 31, 32 and 33 convert video signals output from image pickup devices 4 of the cameras 11, 12 and 13 into digital signals. An image signal processing circuit 34 receives outputs from the A/D convertor circuits 31, 32 and 33, and executes a pixel interpolation process and a color conversion process to output image pickup data.

A memory control circuit 35 controls the A/D convertor circuits 31, 32 and 33, image signal processing circuit 34 and a memory 36 for acquisition, storage and the like of image pickup data. The memory 36 is a volatile memory or a non-volatile memory. The memory stores temporarily image pickup data, and can be used as a storage area for programs of controlling a system controller 37 and a working area for the system controller 37.

An image encoding circuit 39 compression-encodes image pickup data by an encoding scheme such as JPEG. A communication control circuit 38 transmits/receives image pickup data, photographing control data and the like. An internal bus 40 is used for transferring image pickup data and various control signals. The system controller 37 controls the whole apparatus by controlling the memory control circuit 35, image encoding circuit 39 and communication control circuit 38 via the internal bus 40.

Image pickup data is transferred via a network line 41 to a monitor apparatus constituted of a personal computer 42 and a monitor 43 installed at a remote site, so that a view image of the image pickup data can be displayed on the monitor 43.

Next, description will be made on the operation of the wide-angle photographing apparatus constructed as above. Referring to FIG. 1, video signals obtained by synchronously photographing of the cameras 11, 12 and 13 are converted into digital image pickup data by the A/D convertor circuits 31, 32 and 33. Digitalized image pickup data of the cameras is processed in parallel by the image signal encoding circuit 34 which executes the pixel interpolation process and color conversion process. The processed image pickup data is temporarily stored in the memory 36 on the video image frame basis by the memory control circuit 35. In this case, the encoded image pickup data of the cameras 11, 12 and 13 is added with an identification number of the wide-angle photographing apparatus and an identification number capable of identifying each camera of the wide-angle photographing apparatus.

Next, the image encoding circuit 39 sequentially encodes the video image frames of the image pickup data of the cameras 11, 12 and 13. The encoded image pickup data is sent to the communication control circuit 38 and delivered to the network line 41. For example, the network is the Internet using the TCP/IP protocol. The personal computer 42 receives the encoded image pickup data, executes a decoding process by using a control program for the wide-angle photographing apparatus installed in the personal computer 42, and displays photographed images on the monitor 43.

Figure 4:
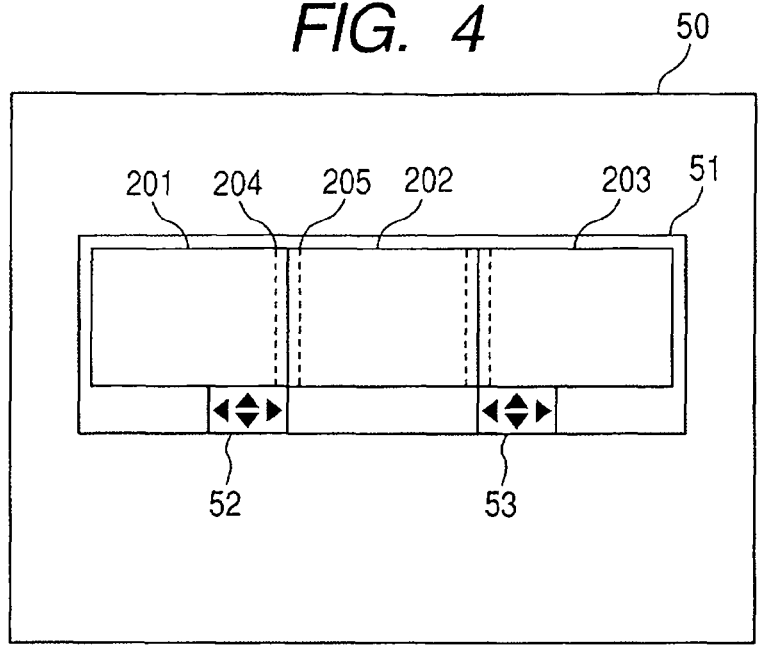
FIG. 4 is a diagram showing examples of photographed images on a monitor of the wide-angle photographing apparatus according to the first embodiment of the present invention.

FIG. 4 is a diagram showing a display example of photographed images on the monitor 43 according to the embodiment. The control program displays an image display window 51 on a screen 50 of the monitor 43. In the frame of the window, photographed images 201, 202 and 203 of the cameras 11, 12 and 13 are displayed in contact with each other as a panorama image. An object in the near field is duplicately displayed in the area sandwitched between dotted lines 204 and 205 near the boundary of the photographed images 201 and 202. However, a width of this area is narrow because the cameras 11 and 12 are disposed at a shorter base line length L, and a parallax amount of the object is also small. Therefore, as the photographed images are actually observed, the images can be viewed in a contiguous state and substantially a panorama image can be viewed.

The image display window 51 shown in FIG. 4 has an adjustment button 52 for finely adjusting the position of the photographed image 201 visually by an observer by using the photographed image 202 as a reference. The boundary position between the photographed images can be adjusted in a horizontal direction by using horizontal direction keys of the adjustment button 52.

For example, if an object to be observed is in a relatively near field and an importance of an image of a far scene is low, the adjustment is made in the manner shown in FIG. 3B. Namely, the image is moved to partially cut the area near the boundary of the photographed images 201 and 202 in such a manner that the images 26a and 26b of the object in the near field to be observed are combined to one image on the boundary of the photographed images 201 and 202. By combining the images in this manner, although the image of a far scene is partially lost, the object to be observed will not be displayed duplicately and the photographed images are displayed seamlessly. Similarly, for the photographed images 202 and 203 shown in FIG. 4, the boundary position of the photographed image is adjusted by an adjustment button 53 by using the photographed image 202 as a reference. The image of an object to be observed can be viewed more seamlessly.

The adjustment buttons 52 and 53 are configured so that the positions of the photographed images 201 and 203 in the vertical direction can be adjusted. It is possible to correct a shift of a photographed image in the vertical direction to be caused by an error of the camera layout, a displacement of an optical axis and the like. Namely, an adjustment amount of each boundary position of photographed images designated by the adjustment buttons is stored in accordance with the control program. The control program is once terminated and when the images are displayed next time, the adjustment amount of each boundary position of the photographed images is read to automatically set the adjustment amount to the image display window.

Figure 5:
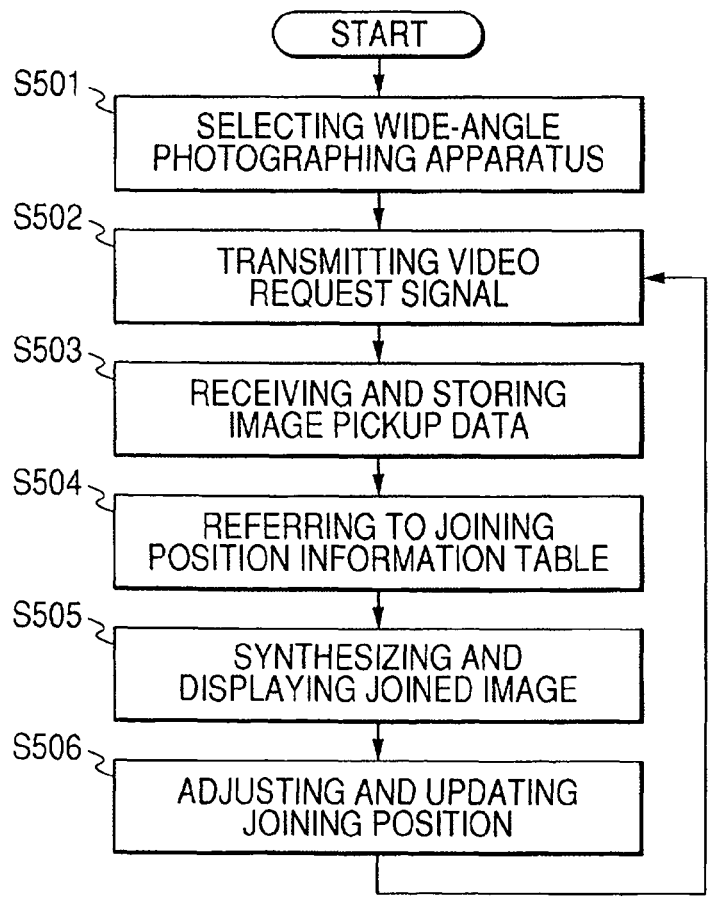
FIG. 5 is a flow chart illustrating a control program for the wide-angle photographing apparatus according to the first embodiment of the present invention.

A series of operations of the wide-angle photographing apparatus is controlled by the control program in the personal computer 42, and the operations are controlled by such a sequence as illustrated in the flow chart of FIG. 5.

If there are a plurality of wide-angle photographing apparatus, at Step S501 the control program in the personal computer 42 designates first a particular wide-angle photographing apparatus by which images are desired to be displayed. At Step S502 an image request signal is transmitted via the network line 41 to the designated wide-angle photographing apparatus. This image request signal is received by the communication control circuit 38 of the designated wide-angle photographing apparatus, and the communication control circuit instructs the system controller 37 to transmit image pickup data of one frame of each of the cameras 11, 12 and 13 to the personal computer 42. The system controller 37 controls the memory control circuit 35, image encoding circuit 39 and communication control circuit 38 to transmit the encoded image pickup data of each frame to the network line 41.

At Step S503 the personal computer 42 receives the encoded image pickup data from the network line 41 and stores it in the memory. At Step S504 the control program reads joining position information of the photographed images of the cameras 11, 12 and 13 from a reference table. At Step S505 the image pickup data of frames of the cameras is decoded and synthesized in accordance with the joining position information, and displayed on the image display window. In this case, the identification number added to each image pickup data is read, and the image pickup data is displayed being juxtaposed on the image display widow at predetermined positions in accordance with the identification numbers.

Next, at Step S506 while viewing the images, the observer can adjust the joining positions of the images by using the adjustment buttons to continuously join the images of the object at the boundaries of the images of the cameras. The joining position information is stored in the reference table to update it, so that the photographed images are displayed in accordance with the updated joining position information.

The image request signal is sent to the wide-angle photographing apparatus to acquire the next image pickup data and display it on the image display window to update it. This operation is repeated by the control program until a stop instruction is issued from a user by operating a reception OFF.

With the arrangement described above, an image of a wide-angle in the horizontal direction can be obtained, and a uniform and high resolution can be obtained because a plurality of image pickup devices are used.

In the above description, photographed images 201, 202 and 203 sent from the wide-angle photographing apparatus are displayed without particular image processing. However, in order to obtain a more-seamless panorama image, a general image distortion correction process of generating a panorama image may be executed. For example, the photographed images may be subjected to a distortion correction process of projecting the images on a cylindrical surface and displaying the images in a juxtaposed state to thereby convert the images into a panorama image as viewed from the center of curvature of the cylinder. A trapezoid correction may be performed for the photographed images 201 and 203 on opposite sides to convert them into an image projected on the same flat plane as the image pickup plane of the center camera 12 as, thereby providing a panorama image viewed from the camera 12.

Such distortion correction processes may be executed by the control program of the personal computer 42 or by the image signal processing circuit of the wide-angle photographing apparatus.

Figure 6:
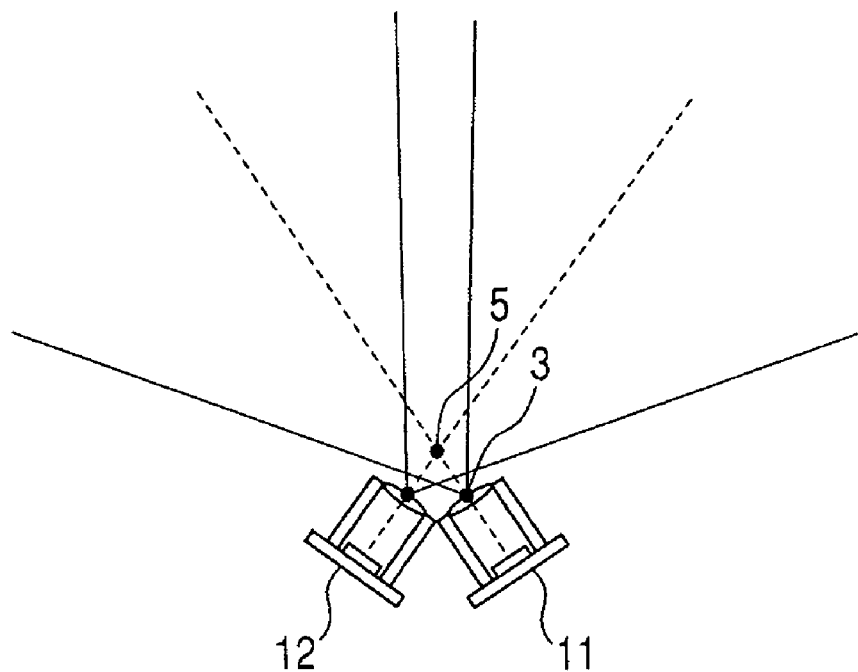
FIG. 6 is an illustrative diagram showing a wide angle-photographing apparatus according to a modification of the first embodiment of the present invention.

In this embodiment, although three cameras are disposed, two cameras may be disposed as shown in FIG. 6. The optical axes of cameras 11 and 12 cross at a cross point 5 on the object side and are disposed at a shortest base line length of the cameras. It is therefore possible to reduce a parallax amount on the boundary of the photographed images and obtain a panorama image without any practical problem.

Second Embodiment

Figure 7:
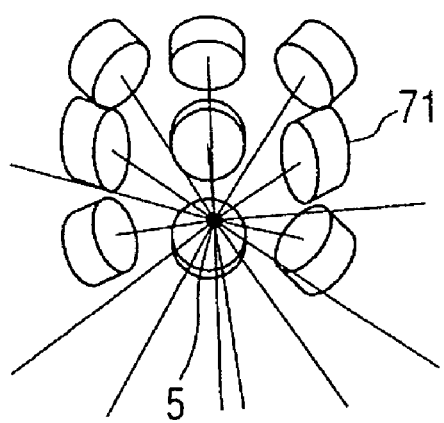
FIG. 7 is a diagram showing an example of a camera layout of a wide-angle photographing apparatus according to a second embodiment of the present invention.

FIG. 7 is an illustrative diagram of a camera layout according to the second embodiment of the present invention. In the first embodiment, although the cameras are disposed along the horizontal direction, in the second embodiments cameras 71 are disposed along both the horizontal and vertical directions in such a manner that the optical axes of the cameras cross at one cross point 5 on the object side.

Figure 8A:
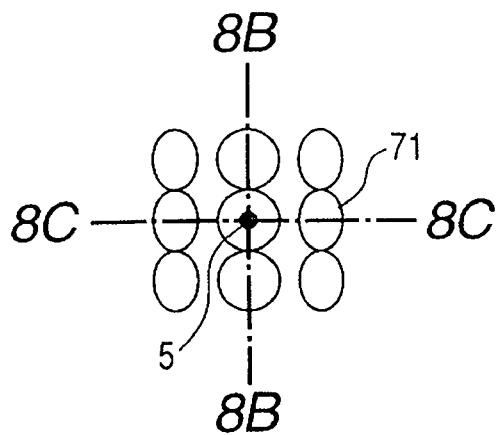
FIGS. 8A, 8B and 8C are a front view and cross sectional views showing a camera layout of the wide-angle photographing apparatus according to the second embodiment of the present invention.
Figure 8B:
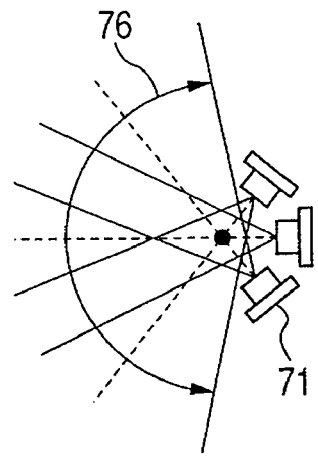
Figure 8C:
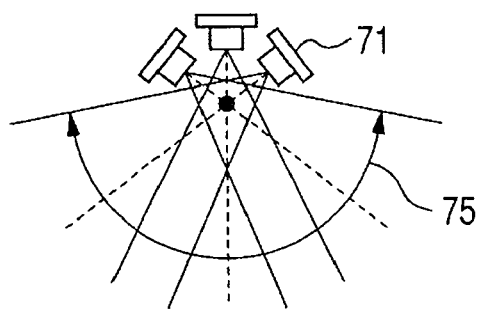

FIG. 8A is a front view of the second embodiment in which the cameras 71 are disposed in a matrix form. FIG. 8B is a cross sectional view taken along line 8C-8C in FIG. 8A and FIG. 8B is a cross sectional view taken along line 8B-8B in FIG. 8A. In the 8C-8C cross sectional view of FIG. 8B, the optical axes of the cameras cross at the cross point 5, and the photographing field angle along the horizontal direction is in the range indicated by an arrow 75. In the 8B-8B cross sectional view of FIG. 8C, the optical axes of the cameras cross at the cross point 5, and the photographing field angle along the vertical direction is in the range indicated by an arrow 76.

With this arrangement, the whole photographing view field is a broad area of generally a semisphere shape so that a broad area can be photographed. The apparatus can be made more compact than a conventional radial layout of cameras. Since the cameras are disposed at a shortest base line length of the cameras, it is possible to narrow the area where an object is photographed duplicately near the boundary of photographed images of the cameras, and thus to obtain an image whose joining portion is not conspicuous.

The structure and operation of the wide-angle photographing apparatus of the second embodiment can be the same as those of the first embodiment.

Third Embodiment

Figure 9:
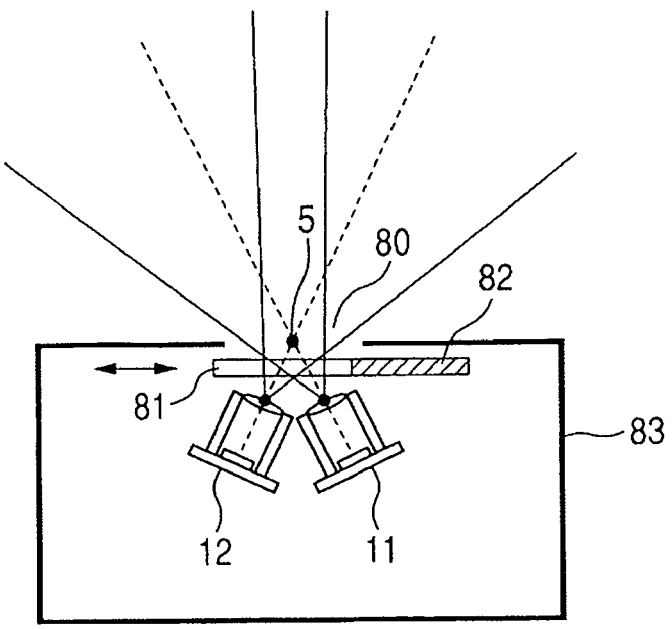
FIG. 9 is a diagram showing the outline structure of a wide-angle photographing apparatus according to a third embodiment of the present invention.
Figure 10:
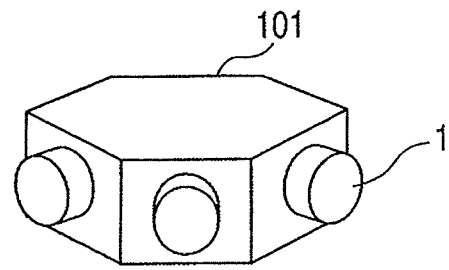
FIG. 10 is a diagram showing a conventional wide-angle photographing apparatus having cameras disposed radially.
Figure 11:
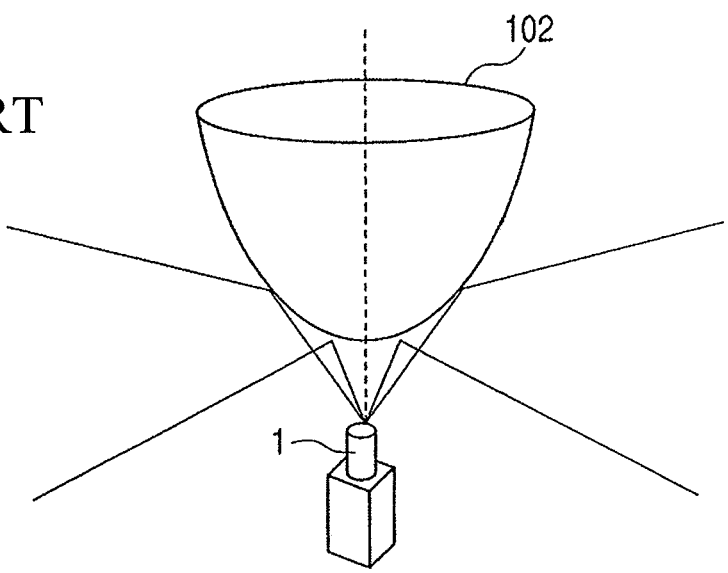
FIG. 11 is a diagram a conventional wide-angle photographing apparatus using a hyperbolic mirror.
Figure 12:
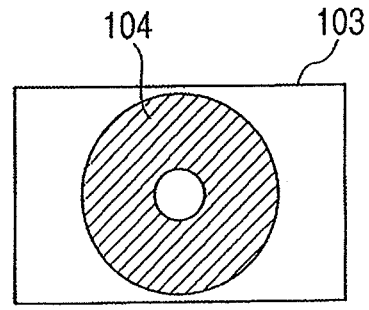
FIG. 12 is a diagram showing a photographed image on an image pickup device of the conventional wide-angle photographing apparatus having the hyperbolic mirror.
Figure 13:
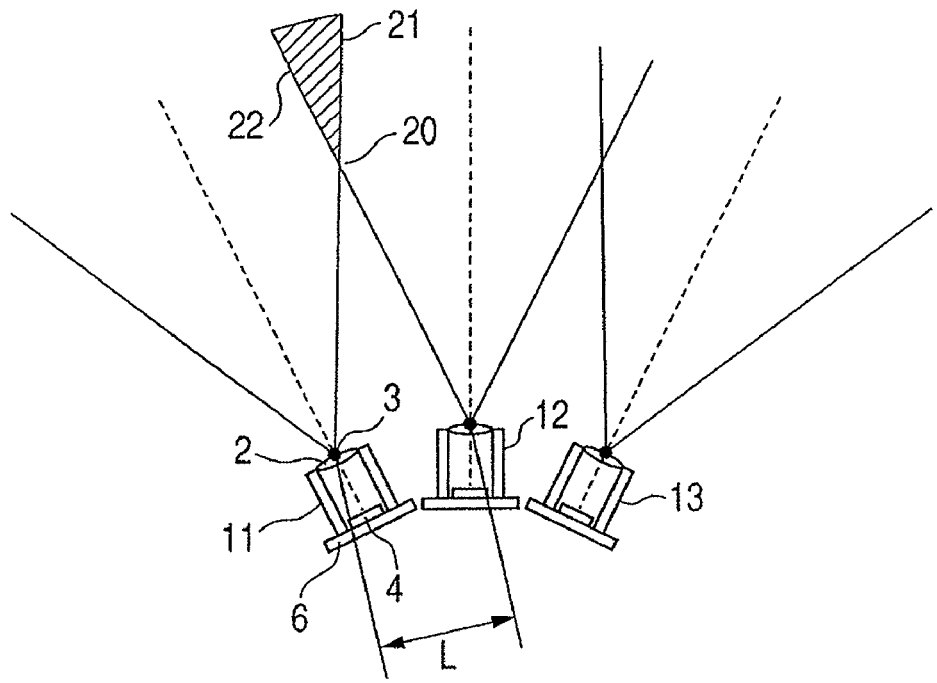
FIG. 13 is a diagram showing a camera layout of a conventional photographing apparatus having cameras disposed radially.
Figure 14:
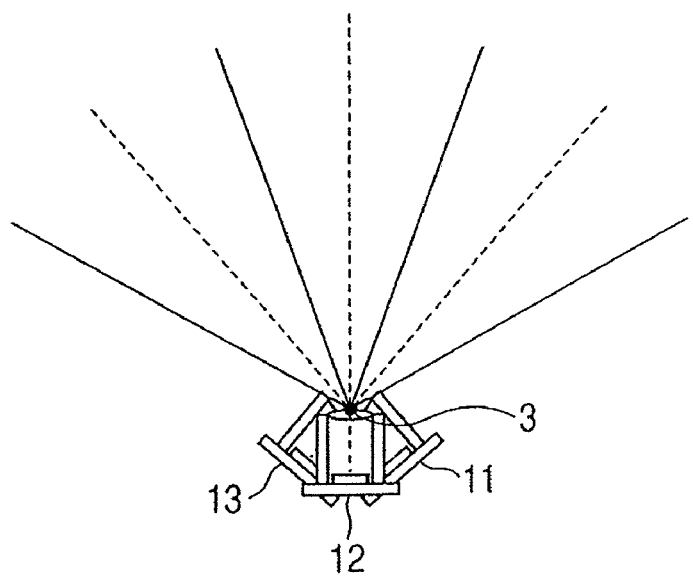
FIG. 14 is a diagram showing an ideal camera layout of a conventional photographing apparatus having cameras disposed radially.

FIG. 9 is an illustrative diagram of the third embodiment of the present invention. If the wide-angle photographing apparatus is used for monitoring, it is necessary to photograph an object having a low illuminance, such as in the night. Generally, a camera using image pickup devices such as CCD photographs an object by setting an infrared cut filter just above the image pickup device in the day, and not by setting the infrared cut filer in a low illuminance.

In the wide-angle photographing apparatus of the third embodiment, mounted in a housing 83 are cameras 11 and 12 disposed in such a manner that the optical axes cross at a cross point 5 similar to the first embodiment. An opening 80 for camera lenses is formed through the housing 83, and an infrared cut filter substrate 81 is supported inside the housing to be slidable relative to the opening by an unrepresented drive mechanism. For example, the drive mechanism may have the structure that a movable member for holding the infrared cut filter substrate 81 is supported by a slide shaft and a screw mounted on the shaft of a motor, and when the motor is driven, the infrared cut filter substrate can be moved along an arrow direction.

An infrared cut filter is formed in an oblique line portion 82 of the infrared cut filter substrate 81, and the other portion is a transparent substrate without an infrared cut filter. By sliding the infrared cut filter substrate along the arrow direction by the drive mechanism, the states with and without the infrared cut filter can be switched.

In this embodiment, by disposing the filter near the cross point of the optical axes of a plurality of cameras and switching the filter, the filter of the cameras can be switched at the same time so that the wide-angle photographing apparatus can be manufactured in a compact size and with a low cost.

The object of the present invention can be achieved also by providing a wide-angle photographing apparatus with a storage medium storing software program codes realizing the functions of the above-described embodiments and making the wide-angle photographing apparatus execute the program codes. In this case, the program codes read from the storage medium realize the embodiment functions so that the storage medium storing the program codes constitutes the present invention.

The storage medium for storing such program codes may be a ROM, a flexible disk, a hard disk, a magneto optical disk, a CD-ROM, a CD-R, a memory card and the like. The hardware and software structure of the above-described embodiments may be replaced with a structure realizing similar functions to those of the embodiments.

The present invention has been described in connection with the preferred embodiments. The present invention is not limited to the above-described embodiments, but various alterations are possible without departing from the scope of claims.

What is claimed is:

1. A photographing apparatus comprising:
   a first image pickup unit having a first photographing field and a second image pickup unit having a second photographing field, the first and second image pickup units configured to form image data;
   an image forming unit configured to form first image data including a first object apart from the first image pickup unit by a first distance, a second object apart from the first image pickup unit by a second distance longer than the first distance, and a third object apart from the first image pickup unit by a third distance longer than the second distance, based on the image data formed by the first image pickup unit, and to form a second image data including the first object apart from the second image pickup unit by a fourth distance, the second object apart from the second image pickup unit by a fifth distance longer than the fourth distance, and the third object apart from the second image pickup unit by a sixth distance longer than the fifth distance, based on the image data formed by the second image pickup unit; and
   a communication control unit configured to transmit to a monitor apparatus the first and second image data formed by the image forming unit,
   wherein principal points of the first and second image pickup units are spaced apart from each other by a predetermined base line length, and
   wherein the first and second image pickup units are disposed such that the first and second photographing fields overlap each other by a same width equal to the predetermined base line length independent of distance from the first and second image pickup units, and wherein the monitor apparatus can change a joining position of the first and second photographing fields, when the monitor apparatus displays the two first objects, the two second objects, and the one third object based on the first and second image data including the first, second and third objects and a reference table indicating the joining position of the first and second photographing fields, such that the monitor apparatus displays the one second object and the two first objects and does not display the third object, and wherein the first and second image pickup units change the focus so as to set in-focus to the second object in accordance with the changing of the joining position.

2. The photographing apparatus according to claim 1, wherein plurality of image pickup units including the first and second image pickup units are disposed in a lattice form, and the optical axes of the optical image pickup units cross at one point on an object side.

3. The photographing apparatus according to claim 1, further comprising:
an optical filter disposed between the cross point of the optical axes of the first and second image pickup units and the lenses to guide object light to each of the first and second image pickup units via the optical filter; and
a switching unit configured to switch the optical filter.

4. The photographing apparatus according to claim 3, wherein said optical filter is an infrared filter.

5. The photographing apparatus according to claim 1, wherein the first and second image pickup units form a plurality of images of an object at a position behind the cross point of the optical axes of the first and second image pickup units.

6. The photographing apparatus according to claim 1, wherein the level of parallax in the plurality of photographed images is minimized such that an object photographed between the boundary of the photographing field of the first image pickup unit and the boundary of the photographing field of the second image pickup unit is not duplicatively reproduced in a resulting panoramic image.

7. The photographing apparatus according to claim 1, wherein an area between the boundary of the photographing field of the first image pickup unit and the boundary of the photographic filed of the second image pickup unit is proportional to said base line length.

8. An image display method of displaying image pickup data received from a photographing apparatus, the image display method comprising:
the photographing apparatus comprising:
a first image pickup unit having a first photographing field and a second image pickup unit having a second photographing field, the first and second image pickup units configured to form an image data;
an image forming unit configured to form a first image data including a first object apart from the first image pickup unit by a first distance, a second object apart from the first image pickup unit by a second distance longer than the first distance, and a third object apart from the first image pickup unit by a third distance longer than the second distance, based on the image data formed by the first image pickup unit, and to form a second image data including the first object apart from the second image pickup unit by a fourth distance, the second object apart from the second image pickup unit by a fifth distance longer than the fourth distance, and the third object apart from the second image pickup unit by a sixth distance longer than the fifth distance, based on the image data formed by the second image pickup unit; and
a communication control unit configured to transmit to a monitor apparatus the first and second image data formed by the image forming unit,
wherein principal points of the first and second image pickup units are spaced apart from each other by a predetermined base line length, the first and the second image pickup units are disposed such that the first and second photographing fields overlap each other by a same width equal to the predetermined base line length independent of distance from the first and second image pickup units, the monitor apparatus:
changing a joining position of the first and second photographing fields, when the monitor apparatus displays the two first objects, the two second objects, and the one third object based on the first and second image data and a reference table indicating the joining position of the first and second photographing fields, such that the monitor apparatus displays the one second object and two first objects and does not display the third object; and
changing a focus so as to set in-focus to the second object in accordance with the changing of the joining position.

9. The image display method according to claim 8, further comprising a step of storing information on said joining position.

10. A non-transitory computer-readable medium recording thereon a computer program for causing a computer which has a monitor apparatus to execute an image display process of displaying image pickup data received from a photographing apparatus,
wherein the photographing apparatus comprises:
a first image pickup unit having a first photographing field and a second image pickup unit having a second photographing field, the first and second image pickup units configured to form an image data;
an image forming unit configured to form a first image data including a first object apart from the first image pickup unit by a first distance, a second object apart from the first image pickup unit by a second distance longer than the first distance, and a third object apart from the first image pickup unit by a third distance longer than the second distance, based on the image data formed by the first image pickup unit, and to form a second image data including the first object apart from the second image pickup unit by a fourth distance, the second object apart from the second image pickup unit by a fifth distance longer than the fourth distance, and the third object apart from the second image pickup unit by a sixth distance longer than the fifth distance, based on the image data formed by the second image pickup unit; and
a communication control unit configured to transmit to the monitor apparatus the first and second image data formed by the image forming unit,
wherein principal points of the first and second image pickup units are spaced apart from each other by a predetermined base line length, the first and second image pickup units are disposed such that the first and second photographing fields overlap each other by a same width equal to the predetermined base line length independent of distance from the first and second image pickup units; and wherein the computer program comprises:

a process of changing a joining position of the first and second photographing fields, when the monitor apparatus displays the two first objects, the two second objects, and the one third object based on the first and second data and a reference table indicating the joining position of the first and second photographing fields, such that the monitor apparatus displays the one second object and the two first objects and does not display the third object; and a process of changing a focus so as to set in-focus to the second object in accordance with the changing of the joining position.

* * * * *